(12) United States Patent
Tanaka

(10) Patent No.: US 11,438,467 B2
(45) Date of Patent: Sep. 6, 2022

(54) APPARATUS, METHOD, AND STORAGE MEDIUM FOR SUPPORTING DATA ENTRY BY CORRECTING ERRONEOUSLY RECOGNIZED CHARACTERS

(71) Applicant: CANON KABUSHIKI KAISHA, Tokyo (JP)

(72) Inventor: Shoji Tanaka, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 59 days.

(21) Appl. No.: 17/029,145

(22) Filed: Sep. 23, 2020

(65) Prior Publication Data

US 2021/0099586 A1 Apr. 1, 2021

(30) Foreign Application Priority Data

Sep. 30, 2019 (JP) .............................. JP2019-178943

(51) Int. Cl.
*H04N 1/00* (2006.01)
*G06K 9/00* (2022.01)
*G06F 3/0482* (2013.01)
*G06V 30/414* (2022.01)
*G06V 30/416* (2022.01)
*G06V 30/10* (2022.01)

(52) U.S. Cl.
CPC ....... *H04N 1/00331* (2013.01); *G06F 3/0482* (2013.01); *G06V 30/414* (2022.01); *G06V 30/416* (2022.01); *G06V 30/10* (2022.01)

(58) Field of Classification Search
None
See application file for complete search history.

(56) References Cited

U.S. PATENT DOCUMENTS

2004/0255218 A1* 12/2004 Tada .................... G06V 30/262
714/747
2006/0215937 A1* 9/2006 Snapp ................ G06V 30/268
382/311

FOREIGN PATENT DOCUMENTS

JP          S6249582 A     3/1987
JP          H04138583 A    5/1992

* cited by examiner

*Primary Examiner* — Andrew H Lam
(74) *Attorney, Agent, or Firm* — Rossi, Kimms & McDowell LLP

(57) ABSTRACT

When a character required to be corrected is specified in a character string of a character recognition result, a plurality of candidate character strings are generated by using a substitution candidate for the specified character and not using a substitution candidate for a character other than the specified character, and one correct character string is finalized from the plurality of generated candidate character strings.

11 Claims, 14 Drawing Sheets

APPARATUS, METHOD, AND STORAGE MEDIUM FOR SUPPORTING DATA ENTRY BY CORRECTING ERRONEOUSLY RECOGNIZED CHARACTERS

BACKGROUND

Field

The present disclosure relates to an apparatus, a method, and a storage medium for supporting data entry.

Description of the Related Art

In Multifunction Printers (hereafter, referred to as "MFP") having multiple functions such as a printer function, a copying function, a facsimile function, or the like, it is widely known that Optical Character Recognition (OCR) processing is performed by using an equipped scanner. Herein, OCR processing refers to a character recognition process of reading printed characters or handwritten characters from a document by using an optical scheme and converting the read characters into character codes that can be used by a computer. OCR processing is performed not only in an MFP but also in a mobile device represented by a compact camera or a smartphone by using an equipped digital camera or the like. By performing OCR processing, it is possible to automate work that involves conversion from a business form in a paper medium, which is represented by accounting settlement work performed in a typical office, into digital data, and an improved productivity in data entry work is expected.

However, there is variation in the quality or the character state of an image read by a scanner. Thus, an accuracy rate of OCR processing does not reach 100%, and erroneous recognition in a character may occur. When an erroneously recognized character is included in a character string acquired by OCR processing, a user is required to directly correct the erroneously recognized character. Typically, correction of a character string is performed by a user on a personal computer (PC) or a display unit of an information processing apparatus. However, since work of finding, specifying, correction, or the like of the erroneously recognized character in a character string is complex, when a large number of documents are processed in particular, there is a problem of an increased workload on the user.

To address the above problem, in a character reading apparatus of Japanese Patent Application Laid-Open No. S62-49582, an erroneously recognized character is distinguished from a correct character by causing a user to specify an erroneously recognized character in a character string resulted from OCR. A character string corrected from the erroneously recognized character is then automatically generated based on words registered in a word dictionary loaded in advance in the character reading apparatus. This enables the user to omit entry work of a correct character, and the burden on the user who corrects an OCR result is thus reduced. Further, a character recognition apparatus of Japanese Patent Application Laid-Open No. H04-138583 causes a user to select a word including erroneous recognition of an OCR result in a character string to be processed. Then, the character recognition apparatus intends to increase efficiency of the work to correct the OCR result by again performing detailed OCR processing on the selected word to generate candidates and searching the candidates for a combination that matches a word dictionary.

In Japanese Patent Application Laid-Open No. S62-49582 or Japanese Patent Application Laid-Open No. H04-138583, however, there still is a problem of a heavy workload on the user in finding and specifying an erroneously recognized character in a character string acquired by OCR processing. Further, since a character string is corrected based on a word dictionary, there is a problem of inability of correcting a character string including an erroneously recognized character to a word not registered in the word dictionary (unknown word). To address the latter problem, it is considered to generate, for an erroneously recognized character, a candidate character string by using a lower-level candidate or a replacement candidate such as an erroneous recognition pattern of OCR processing acquired by learning during operation or the like.

However, there are many character strings having similar appearance in the candidate character strings generated by a combination of characters in the correction target characters. It is easily expected that a workload will be heavy if the user selects a correct character string from such many similar candidate character strings.

SUMMARY

The present disclosure is an apparatus including: at least one memory; and at least one processor that performs: performing character recognition on a document image; specifying a character required to be corrected in a character string acquired as a result of the character recognition; generating a plurality of candidate character strings corresponding to the character string by using a substitution candidate for the specified character and not using a substitution candidate for a character other than the specified character in the character string; and finalizing one correct character string from the plurality of generated candidate character strings.

Further features of the present disclosure will become apparent from the following description of exemplary embodiments with reference to the attached drawings.

DESCRIPTION OF THE EMBODIMENTS

First Embodiment

Figure 1:
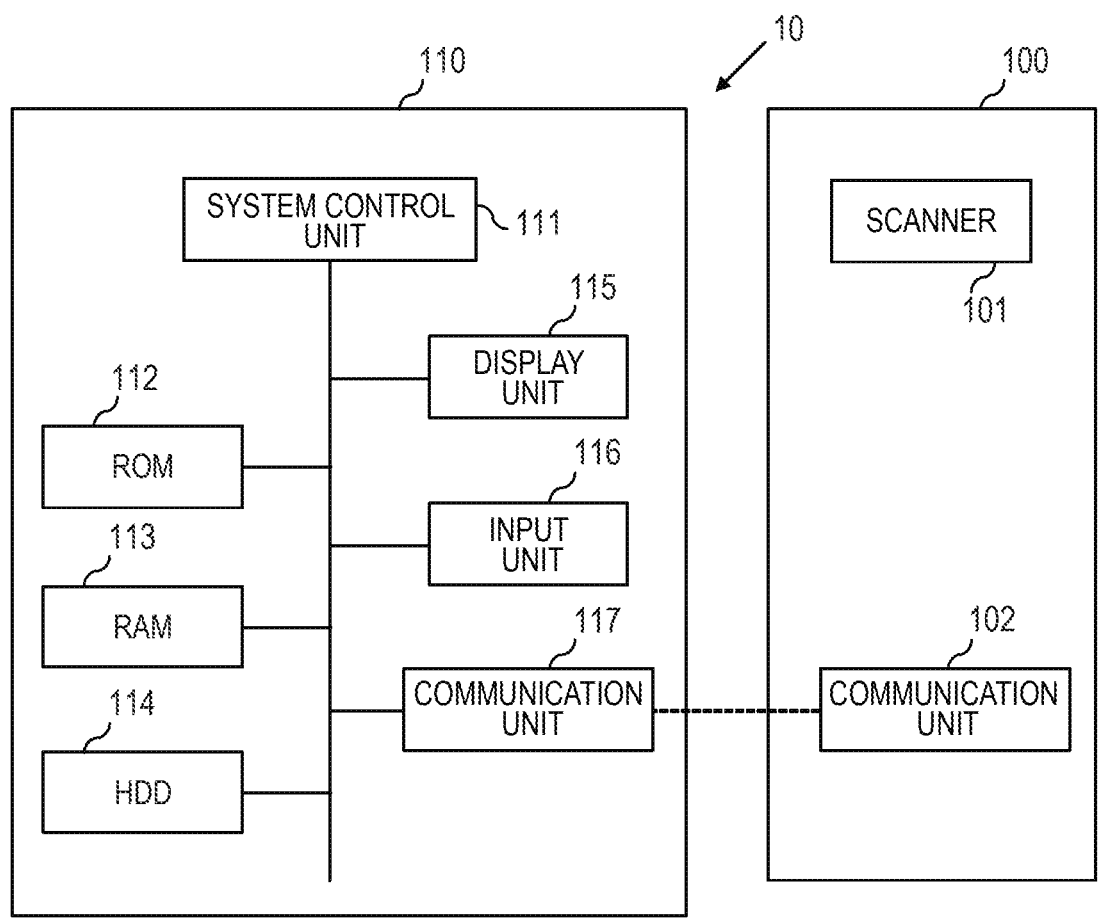
FIG. 1 is a diagram illustrating a configuration of a data entry support system.

FIG. 1 is a diagram illustrating a system configuration of a data entry support system 10 according to a first embodiment of the present disclosure. The data entry support system 10 has a reading apparatus 100 and an information processing apparatus 110. The reading apparatus 100 has a scanner 101 and a communication unit 102 on the reading apparatus side. The scanner 101 scans a document and generates an image of a scanned document (scan image). The communication unit 102 on the reading apparatus side communicates with an external apparatus (not illustrated) via a network.

The information processing apparatus 110 has a system control unit 111, a ROM 112, a RAM 113, an HDD 114, a display unit 115, an input unit 116, and a communication unit 117 on the information processing apparatus side. The system control unit 111 has a CPU or the like and reads a control program stored in the ROM 112 to perform various processes. The RAM 113 is used as a temporary storage region such as a main memory or a work area of the system control unit 111. The HDD 114 stores various data, various programs, or the like. Note that the function or the process of the information processing apparatus 110 described later is implemented when the system control unit 111 reads a program stored in the ROM 112 or the HDD 114 and executes the program.

The display unit 115 has a display or the like and displays various information. The input unit 116 has a keyboard or a mouse and accepts various operations performed by a user. Note that the display unit 115 and the input unit 116 may be integrally provided as with a touch panel. Further, the display unit 115 may perform projection by using a projector. The input unit 116 may recognize the position of a fingertip on a projected image by using a camera. The communication unit 117 on the information processing apparatus side performs a communication process with an external apparatus (not illustrated) via a network.

In the data entry support system 10 of the present embodiment, the scanner 101 of the reading apparatus 100 scans a document such as a business form to generate a scan image. The scan image is transmitted to the information processing apparatus 110 by the communication unit 102 on the reading apparatus side. In the information processing apparatus 110, the communication unit 117 on the information processing apparatus receives a scan image and stores the scan image in a storage device such as the HDD 114. Note that a part of the function of the display unit 115 and the input unit 116 may be included in the reading apparatus 100. Further, the reading apparatus 100 and the information processing apparatus 110 forming the data entry support system 10 may be formed of a single apparatus.

Figure 2:
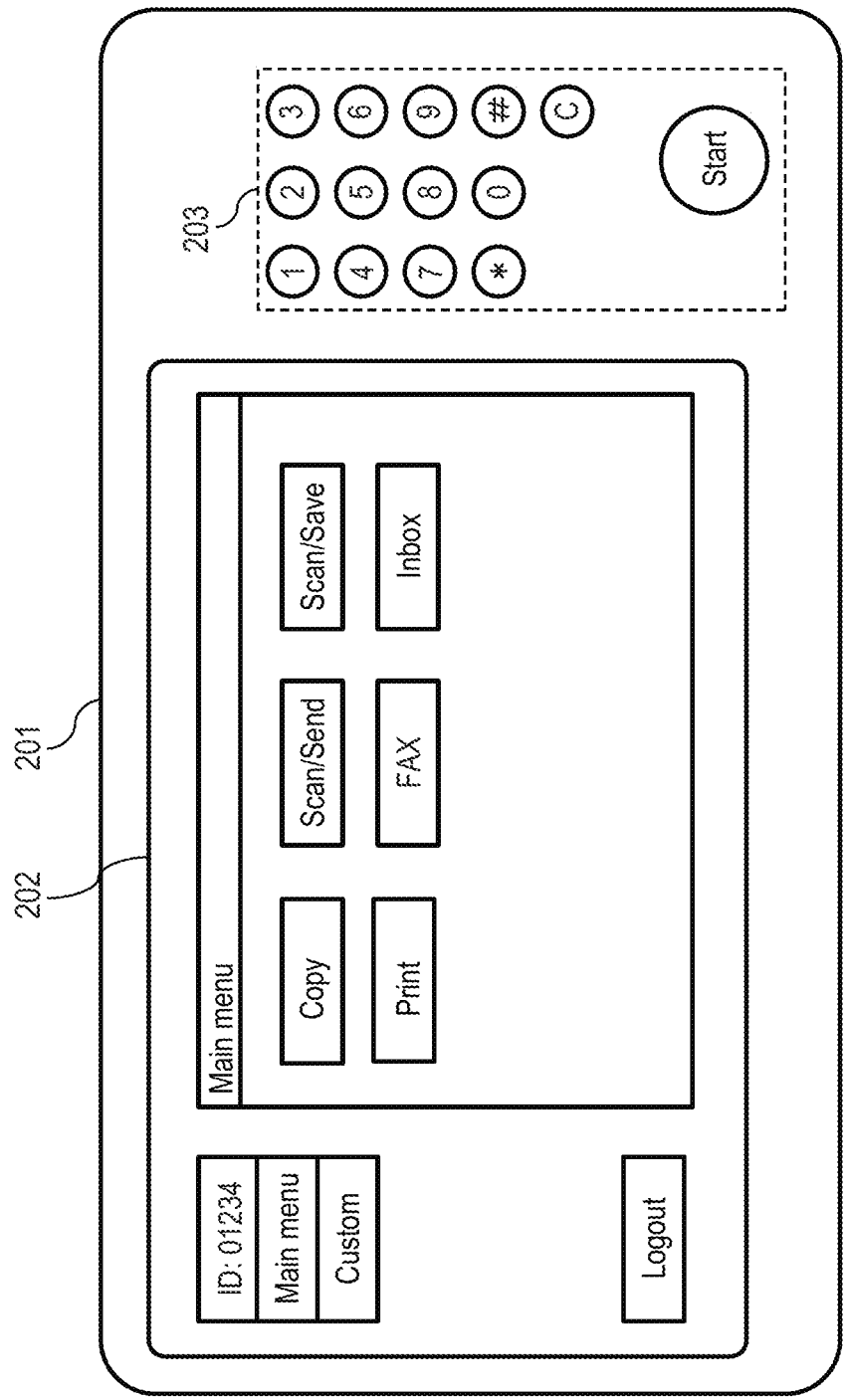
FIG. 2 is an example of a UI displayed on an operation panel.

FIG. 2 illustrates an example of a user interface (UI) displayed on an operation panel 201 in the present embodiment. The operation panel 201 is provided to the display unit 115 of the information processing apparatus 110. The operation panel 201 has a touch panel 202 and number keys 203. A user ID of a logged-in user, a main menu, or the like are displayed on the touch panel 202.

Figure 3:
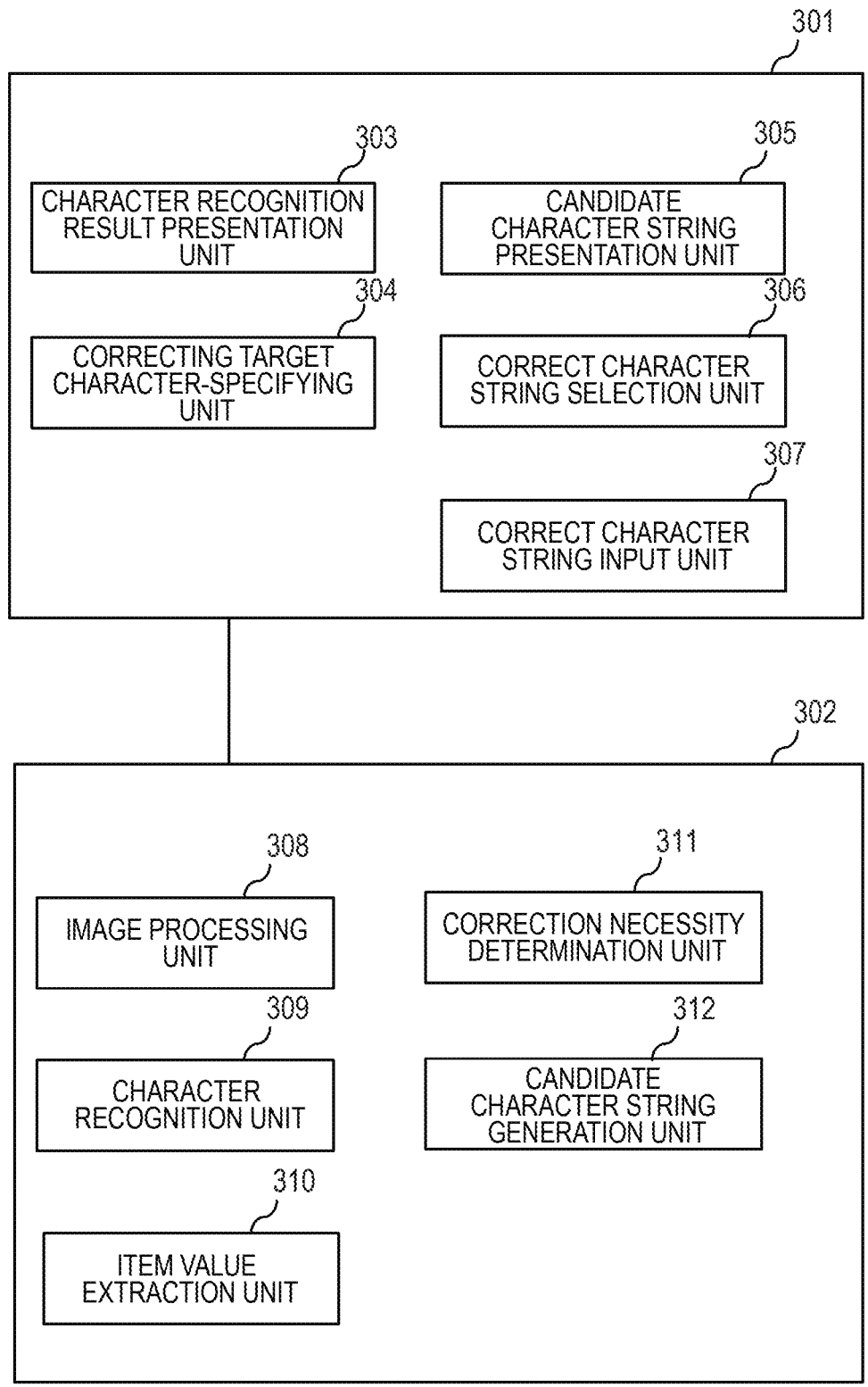
FIG. 3 is a diagram illustrating a software configuration used for implementing the data entry support system (first embodiment).

FIG. 3 is a configuration diagram illustrating a software configuration used for implementing the data entry support system 10 in the first embodiment. The data entry support system 10 has a character recognition result-providing unit 301 and a character recognition result generation unit 302.

The character recognition result-providing unit 301 provides a result of a character recognition process performed by the character recognition result generation unit 302 to the user. Further, the character recognition result-providing unit 301 accepts entry from the user and notifies the character recognition result generation unit 302. That is, the character recognition result-providing unit 301 has a function as a UI and is implemented by the touch panel 202 provided to the information processing apparatus 110 or a display connected to a PC, for example. The character recognition result-providing unit 301 has a character recognition result presentation unit 303, a correction target character-specifying unit 304, a candidate character string presentation unit 305, a correct character string selection unit 306, and a correct character string input unit 307.

The character recognition result presentation unit 303 presents a character string recognized by the character recognition result generation unit 302 to the user. The correction target character-specifying unit 304 accepts a user's specifying operation of a character, which is a correction target, from one or more character strings presented by the character recognition result presentation unit 303. The candidate character string presentation unit 305 presents one or more candidate character strings generated by the character recognition result generation unit 302 to the user. The correct character string selection unit 306 selects a correct character string that is finalized by the user from the candidate character strings presented by the candidate character string presentation unit 305. The correct character string input unit 307 inputs the character string selected by the correct character string selection unit 306 for the correct character string recognized by the character recognition result generation unit 302.

The character recognition result generation unit 302 performs a character recognition process on a document input to the information processing apparatus 110 to acquire a character string and uses a substitution candidate for an erroneously recognized character to generate a candidate character string. The character recognition result generation unit 302 has an image processing unit 308, a character recognition unit 309, an item value extraction unit 310, a correction necessity determination unit 311, and a candidate character string generation unit 312.

The image processing unit 308 performs pre-processing so that a character recognition process can be performed on an input scan image. The character recognition unit 309 performs a character recognition process for converting a character string in a scan image into character codes. The item value extraction unit 310 extracts an item value (described later) registered for a document from a scan image. The correction necessity determination unit 311 determines whether or not correction is required for a character in a character string on which a character recognition process has been performed. The candidate character string generation unit 312 generates a candidate character string by using a substitution candidate for a character for which the correction necessity determination unit 311 has determined that correction is required.

Figure 4:
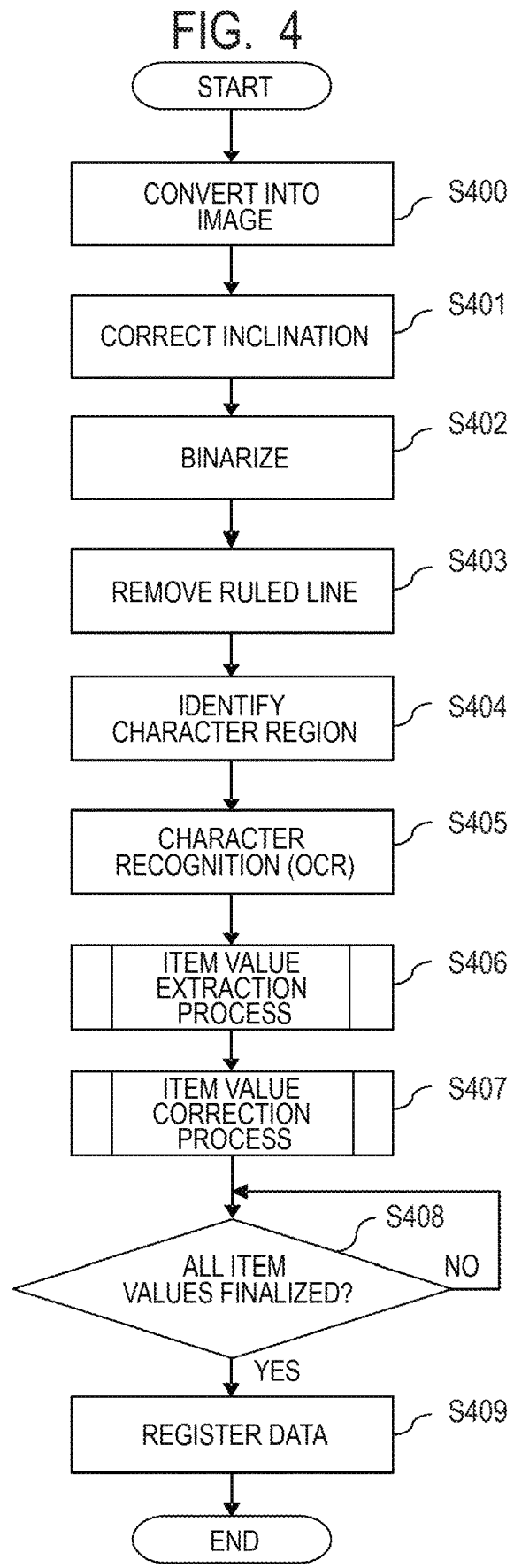
FIG. 4 is a flowchart illustrating an overall flow of a process.

FIG. 4 is a flowchart illustrating an overall flow of a process up to an operation in which the user corrects a character string acquired by a character recognition process and registers the corrected data in the system for a scanned document. First, in S400, a document is converted into a scan image by the reading apparatus 100. Next, in S401, the system control unit 111 of the information processing apparatus 110 detects a description direction of the character string in the scan image and performs an inclination correction process on the converted scan image. Next, in S402, the system control unit 111 performs a binarizing process for binarizing a gray-scale scan image by using a predetermined threshold. Next, in S403, the system control unit 111 performs a ruled-line removal process for removing a ruled line, which is unnecessary for a character recognition process, from the scan image. The process performed in S401 to S403 is categorized into a pre-process to accurately perform a character region identifying process of S404 and a character recognition process of S405 described later.

Next, in S404, the system control unit 111 performs a character region identifying process for identifying a character region on the pre-processed scan image. Next, in S405, the system control unit 111 performs a character recognition process on the scan image in which the character region has been identified. Accordingly, a character code of each character forming a character string is acquired for each character region in the scan image. Next, in S406, the system control unit 111 performs an item value extraction process for extracting an item value required by the user from the scan image.

Figure 5:
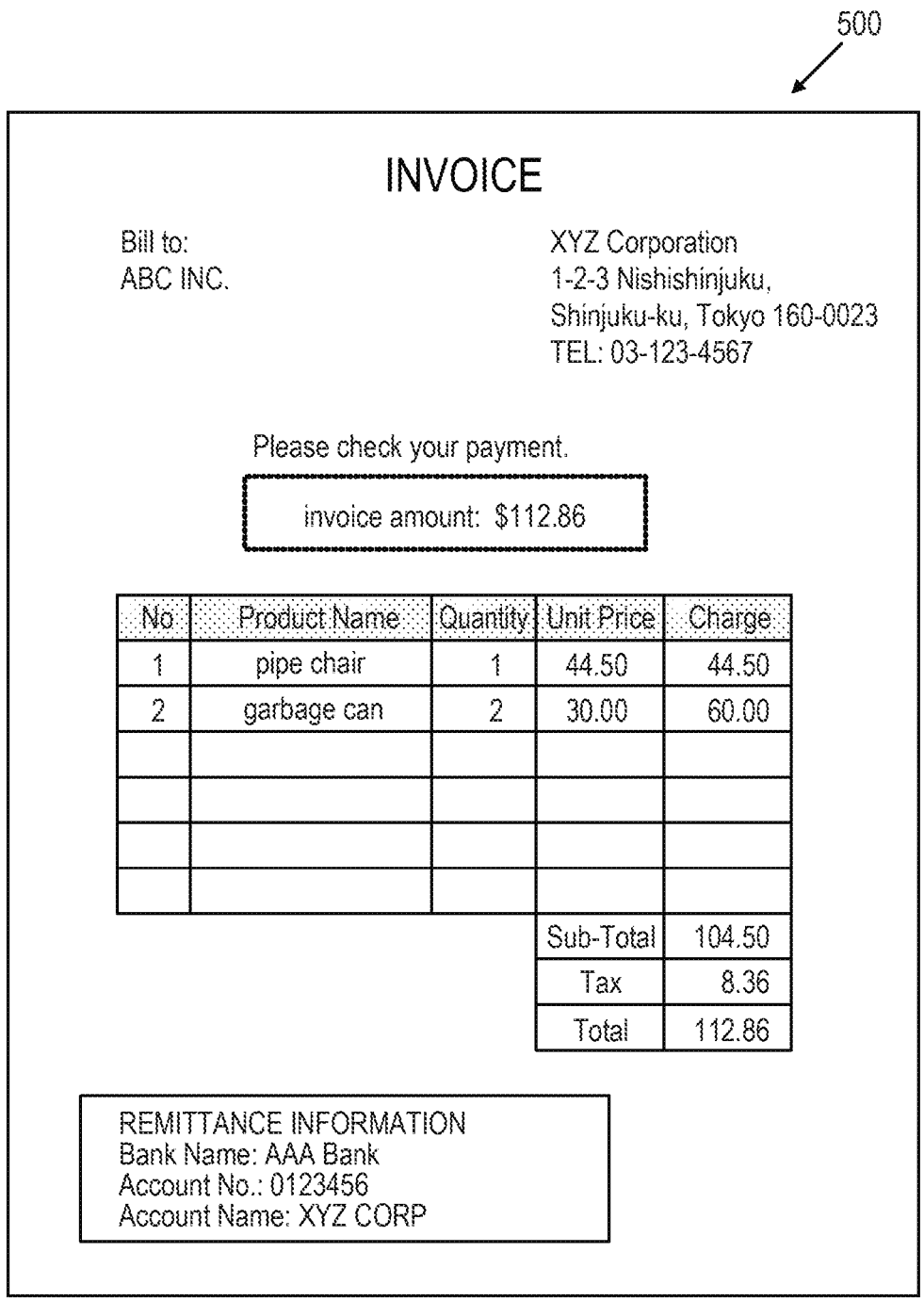
FIG. 5 illustrates an example of a scanned document.

The item value will now be described with reference to FIG. 5 and FIG. 6. FIG. 5 illustrates an example of a document 500 scanned by the reading apparatus 100. In this example, as illustrated in FIG. 5, an example using an invoice as the document 500 will be described. Herein, the item value refers to a value such as "Phone number", "Total amount", or the like (in this example, "03-123-4567", "$112.86", or the like) that are items registered in a system by a data registration process of S409 described later, for example.

Figure 6:
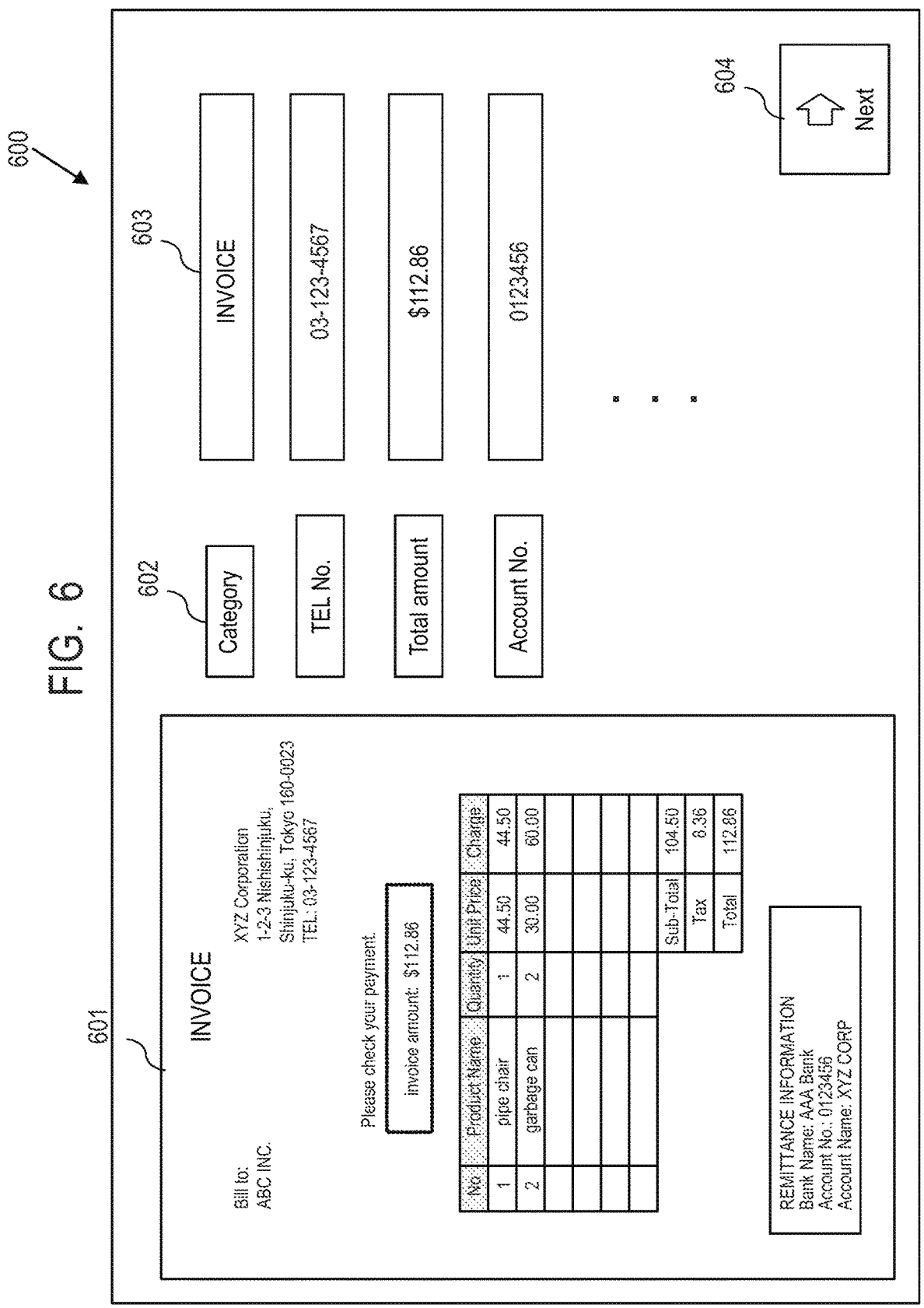
FIG. 6 illustrates an example of an item value display window.

FIG. 6 illustrates an example of an item value display window 600 by which a result of the item value extraction process is presented to the user for the document illustrated in FIG. 5. In a preview window 601, a preview image of a scanned document is displayed. In an item field 602, item names such as "Type", "Phone number", "Total amount", or the like of the scanned text are displayed. In an item value field 603, item values corresponding to respective item fields 602 extracted from a scan image are displayed.

The item value extraction process is implemented when the user specifies a position at which an item value to be extracted is displayed on the preview window 601, for example. For example, when the item value of an item name "Total amount" is extracted, the user may touch a region in which "$112.86" is displayed in the preview window 601.

Further, in the item value extraction process, automatic extraction is possible without requiring a user's specifying operation. In such a case, a scan image is searched for a character string related to an item name based on the item name indicated in the item field 602, and the position of the searched item name is searched for an item value based on a positional relationship between a predefined item name and an item value.

For example, when an item value of the item name "Total amount" is extracted, the type of a scanned document ("Invoice" in this case) is considered, and a scan image is searched for a character string such as "charge" that may indicate the meaning of "Total amount". As a result, an item value is searched for based on the positional relationship between the position of "Amount billed" searched for from the scan image and a position where "Amount billed" and an amount are displayed that is predefined and stored in the information processing apparatus 110. In this example, an item value "$112.86" would be extracted based on a rule related to denotation of a character string of "An item value of the total amount is present on the right side of a character string of "Amount billed"". Note that the scheme for extraction of the item value illustrated above is a mere example, and another scheme may be employed.

The extracted item value is displayed in the field 603 for an item value by the character recognition result presentation unit 303 (see FIG. 3). However, since an erroneously recognized character may be included in a character string acquired by OCR processing when the quality of a scan image is poor, there is a risk of registering erroneous data if an extracted item value is directly registered in the system. Thus, the user is required to see if there is no erroneously recognized character for a character string acquired by a character recognition process and, if necessary, correct the erroneously recognized character. Thus, in the present embodiment, an item value correction process for correcting an item value is performed in S407.

Figure 7:
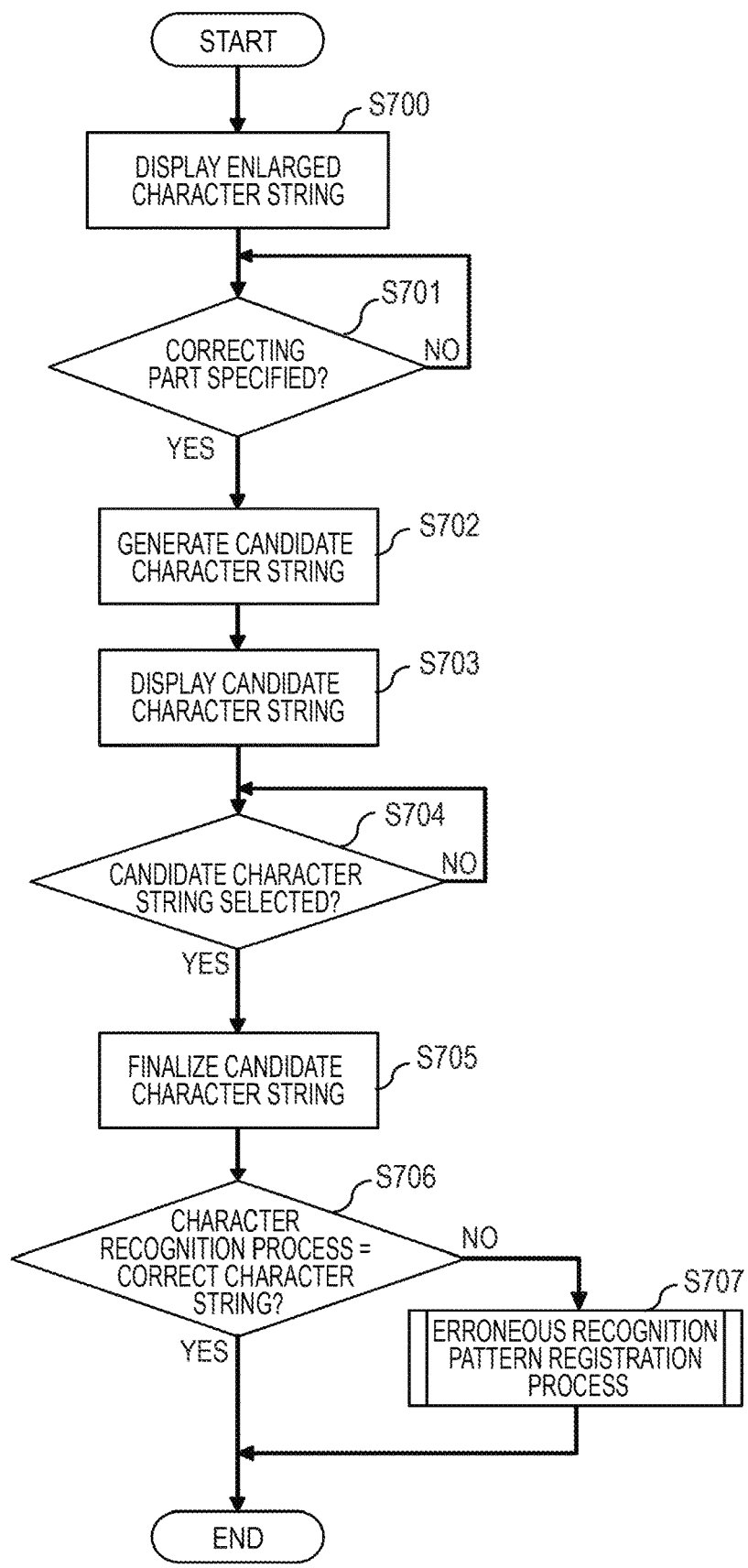
FIG. 7 is a flowchart illustrating an item value correction process.

FIG. 7 is a flowchart illustrating details of the item value correction process of S407. First, in S700, the system control unit 111 displays an enlarged character string on the operation panel 201 in order to urge the user to specify a correcting part that specifies the erroneously recognized character in the character string acquired by the character recognition process. Next, in S701, the system control unit 111 detects whether or not a correcting part is specified by the user in the displayed character string.

Figure 8:
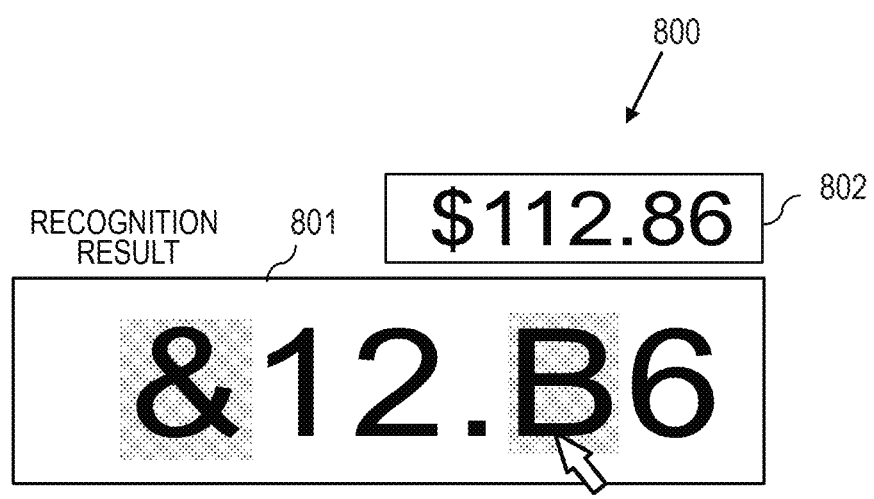
FIG. 8 illustrates an example of a correcting part-specifying window.

FIG. 8 illustrates an example of a correcting part-specifying window 800 displayed for urging the user to specify a correcting part. For example, it is assumed that "$112.86", which is an item value of an item name "Total amount", is recognized as "&12.B6" in a form including an erroneously recognized character. Since the recognized character string is unable to be correctly registered in the system as it stands, correction of the erroneously recognized character is required. Accordingly, in the correcting part-specifying window 800, an enlarged character string acquired by the character recognition process is displayed as illustrated in a field 801 to urge the user to specify a part required to be corrected in the character string.

Note that, in the present embodiment, the correcting part-specifying window 800 is displayed on the operation panel 201 provided to the information processing apparatus 110, and the user may specify a correcting part by performing operation on the displayed correcting part-specifying window 800. However, any scheme may be employed as long as it enables the user to specify a correcting part in a character string whether it is a touch operation on a touch panel provided to an MFP or a specifying operation using a mouse cursor on a character string displayed on a display of a PC.

In the example of FIG. 8, "$1" is erroneously recognized as "&", and "8" is erroneously recognized as "B". Thus, the user specifies "&" and "B" in the enlarged character string 801 as a correcting part. In this operation, with emphasis such as shading, highlight display on the correcting part specified by the user, the user may easily recognize the specified part. Furthermore, if an image corresponding to the enlarged character string is cut out from the scan image and displayed near the field 801 as illustrated in the field 802, the user may easily identify an erroneously recognized character.

Once a specifying operation of a correcting part in accordance with a user instruction is detected in S701, the system control unit 111 generates a candidate character string in S702 based on the specified part.

Figure 9:
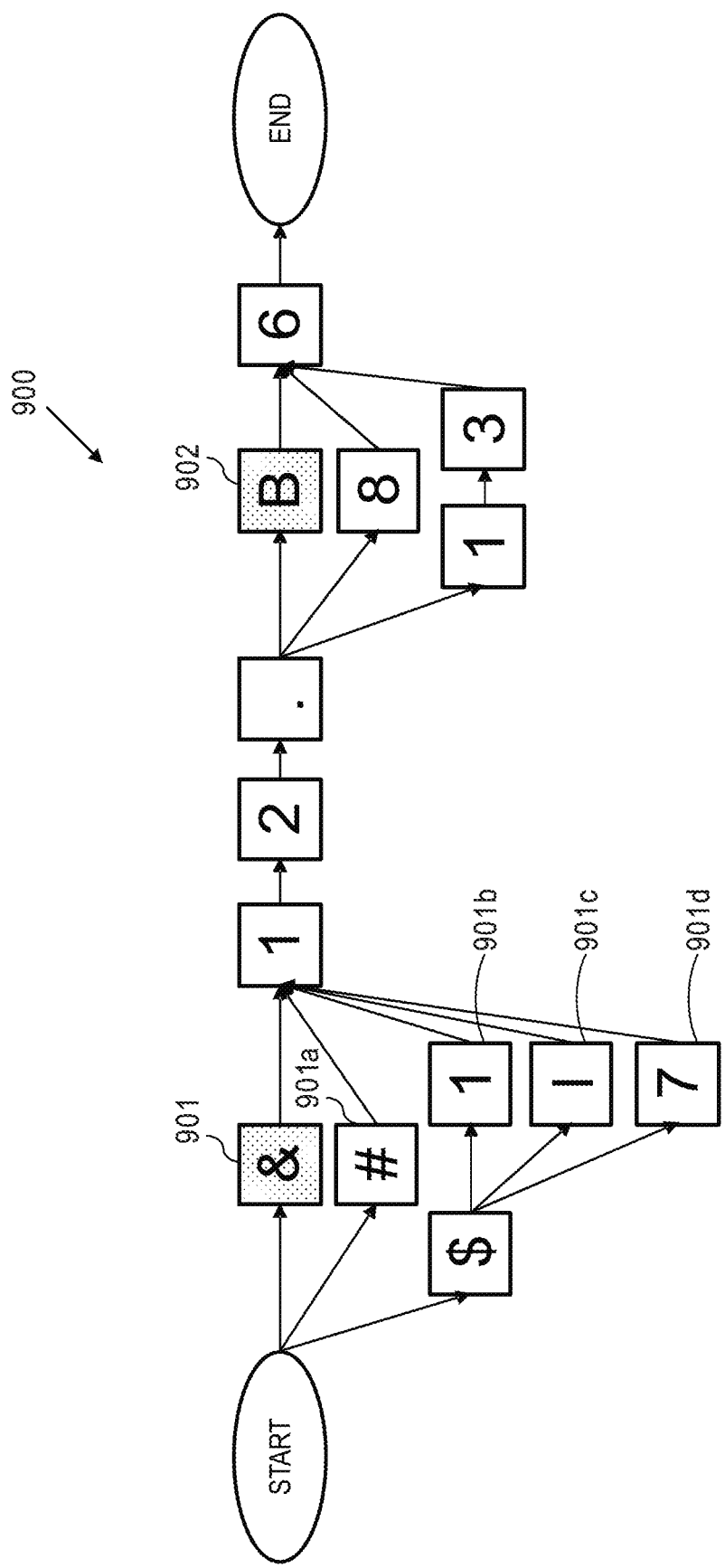
FIG. 9 illustrates an example of a lattice used for generating a candidate character string.

A scheme to generate a candidate character string will be described with reference to FIG. 9. FIG. 9 is a lattice used for generating a candidate character string corresponding to "&12.B6" that is a character string to be corrected in this example. The lattice is configured by using a substitution candidate for the specified correcting part. In the present embodiment, the substitution candidate is defined based on a lower-level candidate of a character acquired by the character recognition process or an erroneous recognition pattern for a character or a character string stored in the information processing apparatus 110.

The lower-level candidate refers to a character or a character string having the second highest likelihood after the character acquired by the character recognition process. For example, in the example of FIG. 9, a character 901a "#" is registered as a lower-level candidate for a character 901 "&". Although one lower-level candidate is typically registered for one part, two or more lower-level candidates may be registered for one part.

Further, the erroneous recognition pattern is a pattern registered for a character that is likely to be erroneously recognized in the character recognition process and a result that is likely to be erroneously recognized for the character. For example, a character string 901b "$1", a character string 901c "$1", and a character string 901d "$7" are registered as the erroneous recognition pattern for the character 901a "&". An erroneous recognition pattern pre-stored in the information processing apparatus 110 may be used, or an erroneous recognition pattern acquired based on a user's correction history for the result of the character recognition process may be used.

Further, in the present embodiment, generation of the lattice 900 that adds a node as illustrated in FIG. 9 by using a lower-level candidate or an erroneous recognition pattern for a character string acquired by a character recognition process is performed to be limited to a character specified by the user in S701. This is because no correction is necessary for a character not determined as erroneous recognition by the user. For example, in the example illustrated in FIG. 8, since characters specified by the user are only "&" and "B", the lattice 900 to which a lower-level candidate and an erroneous recognition pattern are added is generated for the limited nodes of the character 901 "&" and the character 902 "B".

Further, the candidate character strings correspond to all the paths that may be selected from the generated lattice 900. That is, the candidate character string generated from the lattice 900 are the following 15 patterns: "&12.B6", "&12.86", "&12.136", "#12.B6", "#12.86", "#12.136", "$112.B6", "$112.86", "$112.136", "$112.B6", "$112.86", "$112.136", "$712.B6", "$712.86", and "$712.136".

To further refine the candidate character strings, a rule "an amount does not include any character other than $ and numbers" related to denotation of a character string is used, and thereby, candidate character strings which do not adapt to the rule are excluded. Accordingly, the 15 patterns of candidate character strings described above are refined to the following 4 patterns: "$112.86", "$112.136", "$712.86", and "$712.136".

Furthermore, rules "two digits are placed on the right side of a dot" and "a comma is put every three digits in a number on the left side of a dot" related to denotation of a character string is used, and thereby, candidate character strings which are not adapted to the rule are excluded. Accordingly, the four patterns of candidate character strings described above are refined to the following two patterns: "$112.86" and "$712.86".

Note that, as a scheme to refine a plurality of candidate character strings, the scheme to use character strings generated from a lattice as used herein is an example, and other various schemes may be considered. For example, when the item name is "name", a rule "no number is included" related to denotation of a character string may be used. Further, a scheme to select a path having the highest likelihood by applying a rule related to denotation of a character string, such as an occurrence probability of a character, a transition probability of adjacent characters, or the like, to a lattice may be employed for a typical item value.

Figure 10:
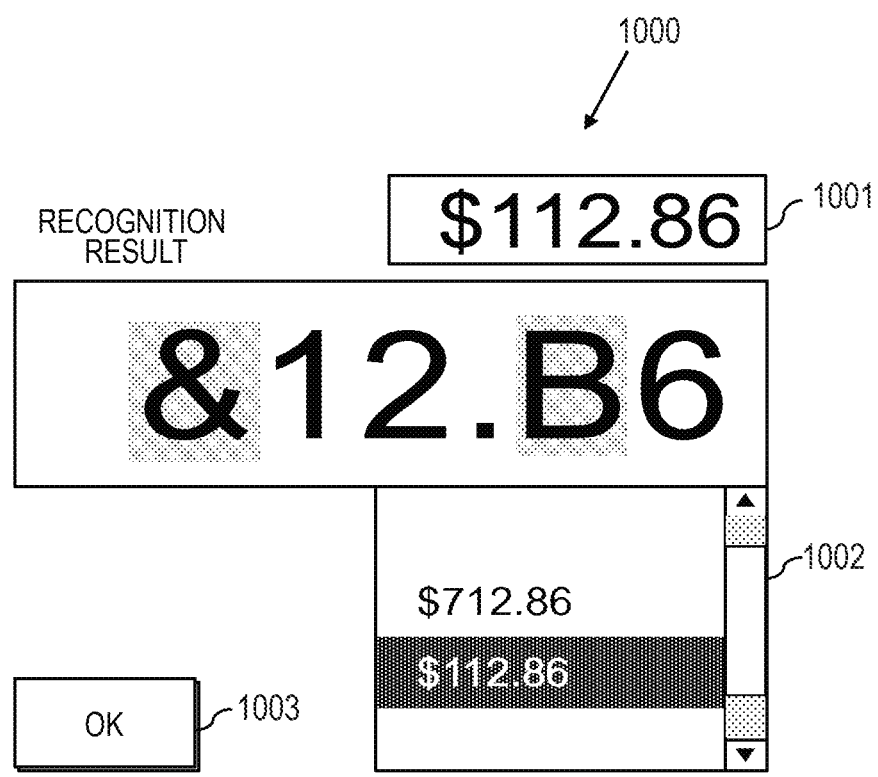
FIG. 10 illustrates an example of a correct character string selection window.

Turning back to the flowchart of FIG. 7, in S703, the system control unit 111 displays the candidate character string generated in S702 on the operation panel 201. FIG. 10 illustrates an example of a correct character string selection window 1000 used for causing the user to select a correct character string by using the generated candidate character strings. As illustrated in FIG. 10, to cause the user to select a correct character string from a plurality of candidate character strings, candidate character strings are displayed in the user interface as a scrollable dropdown list 1002, for example, in the correct character string selection window 1000.

Then, in S704, the system control unit 111 detects whether or not one character string is selected from a plurality of candidate character strings in accordance with a user instruction. Herein, in the correct character string selection window 1000, one character string is selected from character strings displayed as the dropdown list 1002, an OK button 1003 is pressed, and thereby it is determined that one correct character string is selected from the plurality of candidate character strings.

Note that, when no correct character string is displayed in the dropdown list 1002, a user instruction to finalize a character string is provided by inputting characters via a keyboard provided to the input unit 116 in the same manner as the conventional operation. In this operation, the user may select a candidate character string that is the closest to a correct character string from the dropdown list 1002 and then correct only the erroneously recognized character. Further, it may be possible to input all the characters forming a correct character string without selecting a candidate character string from the dropdown list 1002.

Once one character string is selected from a plurality of candidate character strings and the OK button 1003 is pressed, the system control unit 111 finalizes the correct character string in S705. Next, in S706, the system control unit 111 determines whether or not the character string acquired by the character recognition process in S405 and the correct character string finalized in S705 are the same. If they are the same, that is, if the character string was not corrected, the process ends. On the other hand, if they are different from each other, that is, if the character string was corrected, in S707, the system control unit 111 compares the character string acquired by the character recognition process with the correct character string finalized by the user instruction. Thereby, an erroneous recognition pattern registration process for acquiring and registering an erroneous recognition pattern is performed.

Figure 11:
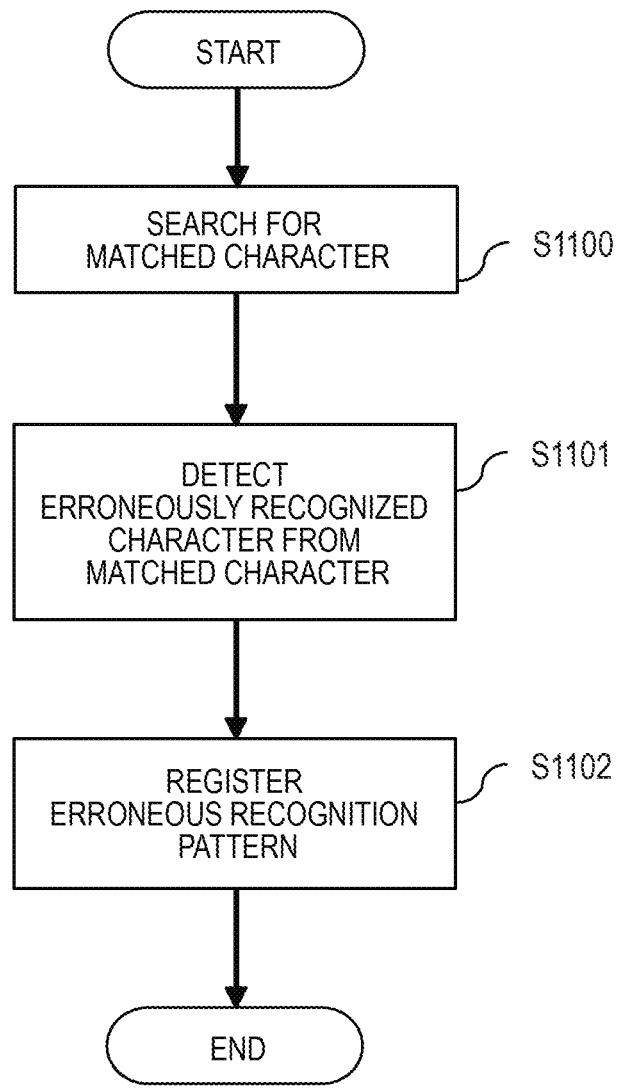
FIG. 11 is a flowchart illustrating an erroneous recognition pattern registration process.

FIG. 11 is a flowchart illustrating an erroneous recognition pattern registration process performed in S707. First, in S1100, the system control unit 111 compares the character string acquired by the character recognition process with the correct character string finalized by the user instruction and searches for a matched character. For example, when the result of the character recognition process is "&12.B6" and the correct character string is "$112.86", the matched characters are "1", "2", ".", and "6" from the top. Note that the matched character can be found from a graph obtained by edit distance calculation between two character strings, for example.

Next, in S1101, the system control unit 111 detects an erroneously recognized character other than the matched character string. In the case of the example of FIG. 11, the erroneously recognized characters are "&" and "B". Finally, in 51102, the system control unit 111 registers an erroneous recognition pattern in an erroneous recognition pattern registration unit (not illustrated) for each erroneously recognized character. In the case of the example of FIG. 11, the following erroneous recognition patterns "&" to "$1" and "B" to "8" are registered.

Accordingly, an erroneous recognition pattern can be acquired and learned every time the user corrects a result of a character recognition process. The learned erroneous recognition pattern is used when the lattice 900 is generated next time and later. For an already registered erroneous recognition pattern, the number of times of correction may be used as a weight when a candidate character string is generated by counting the number of times of correction, for example.

In response to the end of the flowchart of FIG. 11 that is the erroneous recognition pattern registration process of S707, the process returns to the flowchart of FIG. 4. Then, in S408, the system control unit 111 determines whether or not all the item values are finalized. When the user presses a "Next" button 604 in the item value display window 600 (FIG. 6), it is determined that all the item values have been finalized. Then, in S409, the system control unit 111 performs a data registration process for registering data in the system based on the item value 603 displayed in the item value display window 600. Accordingly, all the processes end.

As described above, according to the present embodiment, a candidate character string is generated by causing the user to specify a character required to be corrected in a character string acquired by a character recognition process and using a lower-level candidate or an erroneous recognition pattern for the specified character. Accordingly, since a candidate character string can be refined, a correct character string can be selected from the candidate character string, and a burden on the user performing data entry work can be reduced. Further, when a candidate character string is generated, since no dictionary is required, it is possible to cope with any character strings including an unknown word.

Second Embodiment

Next, a second embodiment of the present disclosure will be described. As described above, in the first embodiment, a character required to be corrected is specified based on a user instruction for a character string acquired by a character recognition process. In contrast, in the present embodiment, a character required to be corrected is specified without involving a user instruction based on a reliability degree for each character acquired in a character recognition process. In the present embodiment, a flowchart illustrating an overall flow of the process is the same as FIG. 4 illustrated in the first embodiment. Further, the flowchart for the item value correction process in S407 of FIG. 4 is basically the same as FIG. 7 described in the first embodiment. In the step of detecting a correcting part in S701, however, a reliability degree acquired in a character recognition process is used without involving a user instruction as with the first embodiment.

Figure 12:
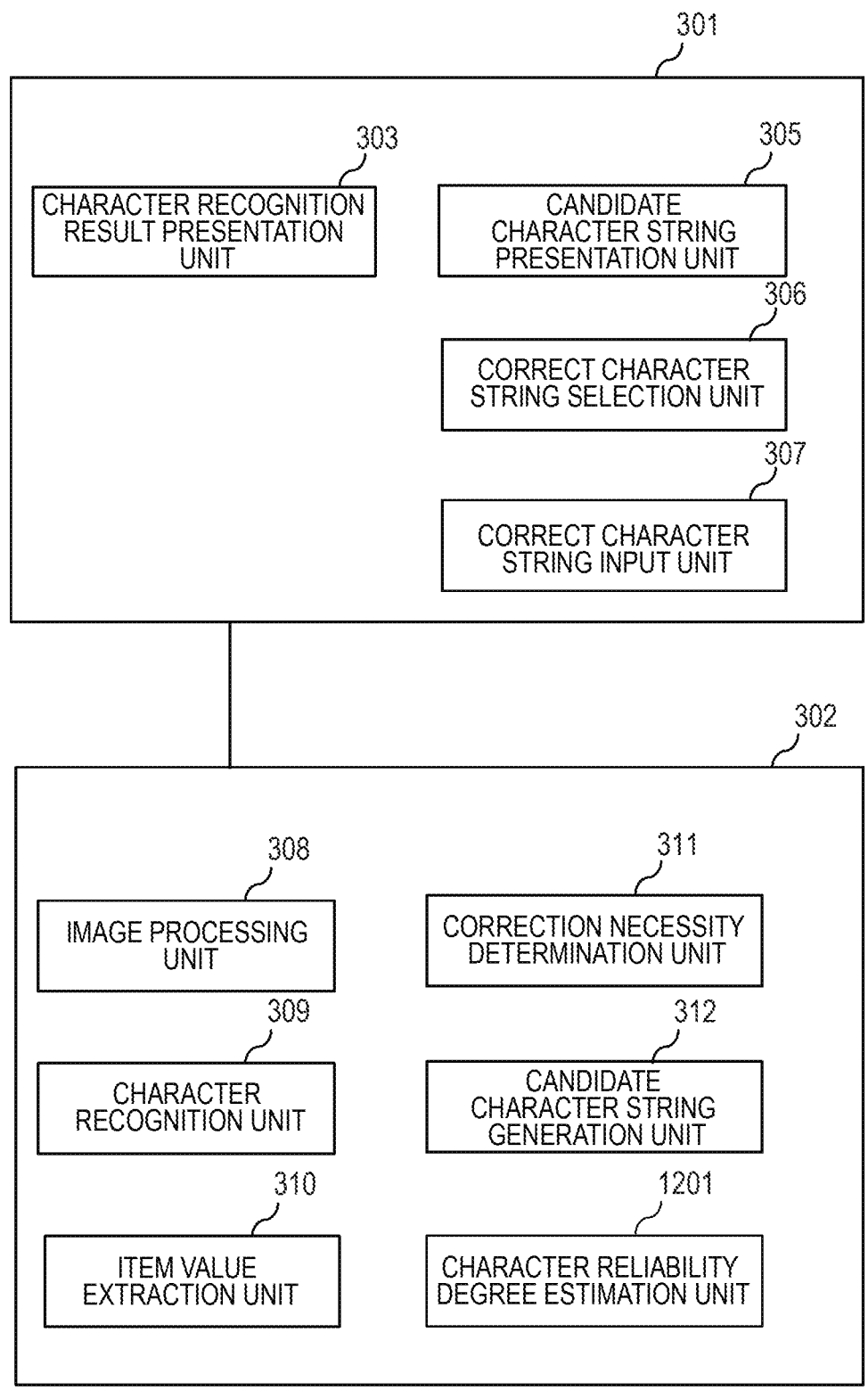
FIG. 12 is a diagram illustrating a software configuration used for implementing the data entry support system (second embodiment).

FIG. 12 is a configuration diagram illustrating a software configuration for implementing the data entry support system 10 in the second embodiment. The difference from the software configuration (FIG. 3) in the first embodiment is that the character recognition result-providing unit 301 does not have the correcting target character-specifying unit (304 of FIG. 3) and, instead, the character recognition result generation unit 302 has a character reliability degree estimation unit 1201.

Figure 13:
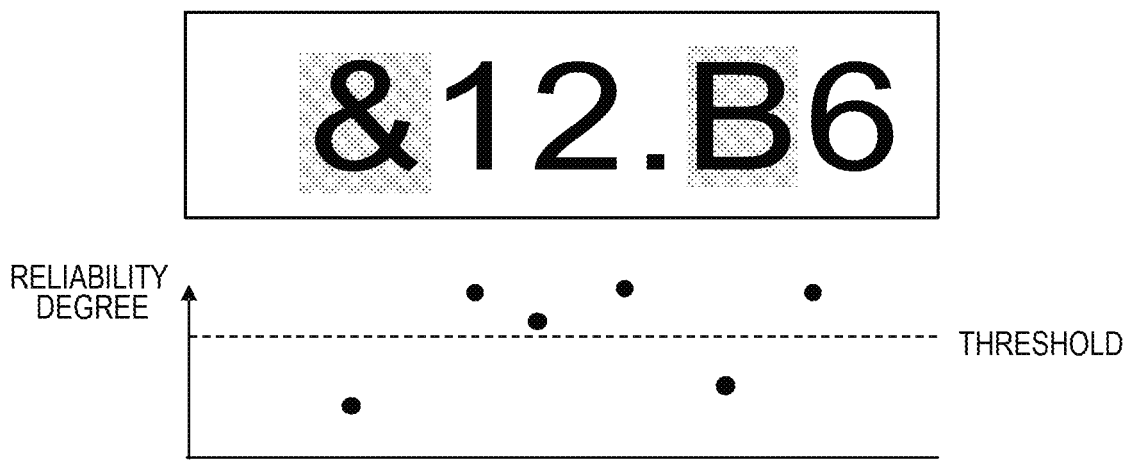
FIG. 13 is a diagram illustrating a reliability degree for each character for a character recognition result.

FIG. 13 illustrates an example of a reliability degree of a result of a character recognition process on a character basis for a character string acquired by the character recognition process. The example of FIG. 13 illustrates a reliability degree for each character acquired by the character reliability degree estimation unit 1201 when the character string "$112.86" is recognized as "&12.B6". In this example, it is found that the reliability degree is low for "&" and "B" and the reliability degree is high for the remaining characters. A dashed line in FIG. 13 indicates a threshold set in advance for determining whether or not a result of a character recognition process is reliable.

In the present embodiment, the correction necessity determination unit 311 specifies a character required to be corrected based on a rule "correction is required for a character whose reliability degree is lower than the threshold". As a result, characters "&" and "B" are correcting targets, and a lattice to which lower-level candidates and erroneous recognition patterns are added is generated for only these characters. Note that the scheme to generate a candidate character string from a generated lattice is the same as that in the method described in the first embodiment.

Figure 14:
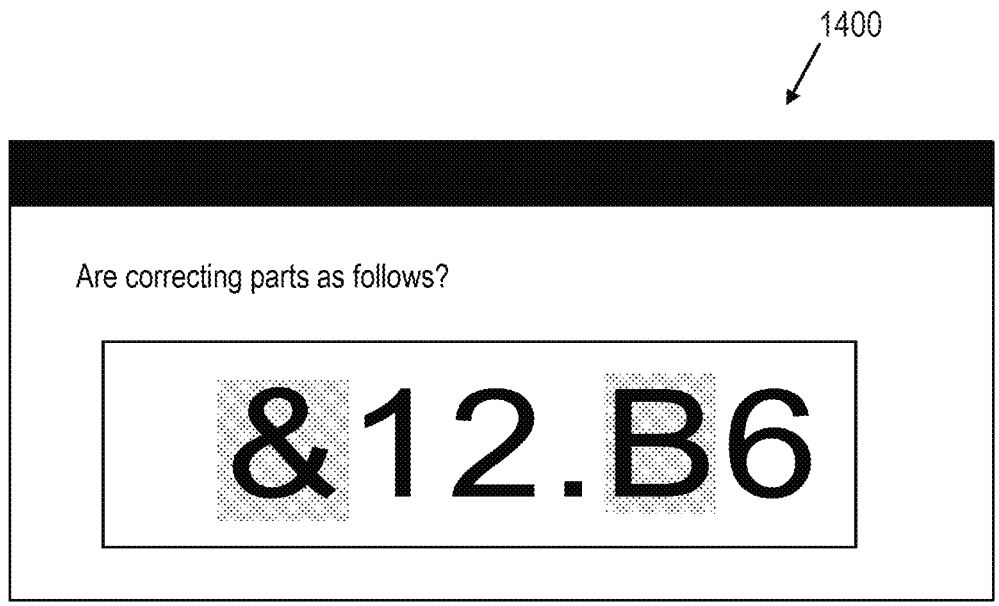
FIG. 14 illustrates an example of a corrected part confirmation window.

Note that, when it is determined whether or not correction is required using a reliability degree of a result of a character recognition process, a threshold set in advance on a character basis may be used without a use of the same threshold for all the characters. Further, after the character reliability degree estimation unit 1201 uses a reliability degree and selects one or more candidates for a character required to be corrected, a correcting part confirmation window 1400 may be presented to the user as illustrated in FIG. 14 to cause the user to confirm a character to be corrected.

As described above, according to the present embodiment, since it is no longer necessary for the user to find a character erroneously recognized in a character recognition process and specify the character, it is possible to make data entry work more efficient.

Third Embodiment

Next, a third embodiment of the present disclosure will be described. In the present embodiment, a character required to be corrected in a character string acquired by a character recognition process is selected using a database (dictionary) used for specifying a correcting character (not illustrated) and pre-installed in the information processing apparatus 110. In the dictionary used for specifying a correcting character, a character required to be corrected is pre-registered. The character required to be corrected refers to a character that is likely to be erroneously recognized by the character recognition unit 309. Note that, since erroneous recognition in a character recognition process also includes a combination of a plurality of characters as seen in the case where "$1" is erroneously recognized as "&", registration is made not only on a character basis but also in combination of characters in the dictionary used for specifying a correcting character.

For example, a character string acquired by a character recognition process is "&12.B6". Herein, when characters "&" and "B" are registered in the dictionary used for specifying a correcting character, the correction necessity determination unit 311 determines that the characters "&" and "B" in the character string correspond to characters or a character string required to be corrected. Note that, in the present embodiment, the correction necessity determination unit 311 can determine a character required to be corrected but not finalize the determination. Thus, if the correction necessity determination unit 311 selects a character required to be corrected, the character is presented in the correcting part confirmation window 1400 (FIG. 14), and it is finalized whether or not correction is required based on a user instruction. Note that the correction necessity determination unit 311 may be configured to finalize a character required to be corrected.

Then, the lattice 900 as illustrated in FIG. 9 is generated, and a candidate character string is generated from the generated lattice. The scheme to generate a candidate character string is the same as that in the method described in the first embodiment.

As described above, according to the present embodiment, a dictionary used for specifying a correcting character is used to select a correcting character and cause the user to finalize whether or not the selected correcting character is required to be corrected. Accordingly, since all the user has to do is to finalize whether or not it is necessary to correct the character selected based on the dictionary used for specifying a correcting character, it is possible to make data entry work more efficient.

OTHER EMBODIMENTS

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-178943, filed Sep. 30, 2019, which is hereby incorporated by reference herein in its entirety.

What is claimed is:

1. An apparatus comprising:
at least one memory; and
at least one processor that performs:
presenting a character string obtained as a character recognition result by performing character recognition on a document image;
specifying a character instructed by a user from a plurality of characters included in the presented character string;
generating a plurality of candidate character strings corresponding to the presented character string by using a substitution candidate for the specified character and not using a substitution candidate for a character other than the specified character in the presented character string; and
finalizing one correct character string from the plurality of generated candidate character strings based on a second instruction from a user.

2. The apparatus according to claim 1, wherein the plurality of candidate character strings corresponding to the presented character string are generated by using the substitution candidate for the specified character and not using a substitution candidate for each of a plurality of characters other than the specified character in the character string.

3. The apparatus according to claim 1, wherein the substitution candidate is formed of a lower-level candidate and/or an erroneous recognition pattern for the specified character.

4. The apparatus according to claim 3, wherein the lower-level candidate is registered in advance.

5. The apparatus according to claim 1, wherein the at least one processor further performs: presenting the plurality of candidate character strings,
wherein the one correct character string is finalized from the plurality of presented candidate character strings based on the second instruction from the user.

6. The apparatus according to claim 5, wherein before the one correct character string is finalized from the plurality of presented candidate character strings, the plurality of candidate character strings are refined based on a rule related to denotation of a character string.

7. The apparatus according to claim 5, wherein the at least one processor further performs: registering an erroneous recognition pattern for the specified character based on the second instruction.

8. The apparatus according to claim 1, wherein the at least one processor further performs: accepting entry of the correct character string from a user when it is determined that the correct character string is not present in the plurality of candidate character strings.

9. A method for supporting data entry, the method comprising:
presenting a character string obtained as a character recognition result by performing character recognition on a document image;
specifying a character instructed by a user from a plurality of characters included in the presented character string;

generating a plurality of candidate character strings corresponding to the presented character string by using a substitution candidate for the specified character and not using a substitution candidate for a character other than the specified character in the presented character string; and finalizing one correct character string from the plurality of generated candidate character strings based on a user instruction.

10. A non-transitory computer-readable storage medium that stores a program, wherein the program causes at least one processor to perform:

presenting a character string obtained as a character recognition result by performing character recognition on a document image;

specifying a character instructed by a user from a plurality of characters included in the presented character string;

generating a plurality of candidate character strings corresponding to the presented character string by using a substitution candidate for the specified character and not using a substitution candidate for a character other than the specified character in the presented character string; and finalizing one correct character string from the plurality of generated candidate character strings based on a user instruction.

11. An apparatus comprising:

a controller including a processor and a memory, the controller configured to:

control a display to display a character string including characters obtained by performing character recognition on a document image;

specify a character instructed by a user among the characters;

control the display to display candidate character strings corresponding to the character string, wherein each of the candidate character strings includes all of the characters other than the specified character and a character different from the specified character instead of the specified character; and specify one of the displayed candidate character strings based on a user instruction.

* * * * *